No. 860,862. PATENTED JULY 23, 1907.
M. R. FULLER.
FUMIGATOR.
APPLICATION FILED JAN. 29, 1907.
3 SHEETS—SHEET 1.
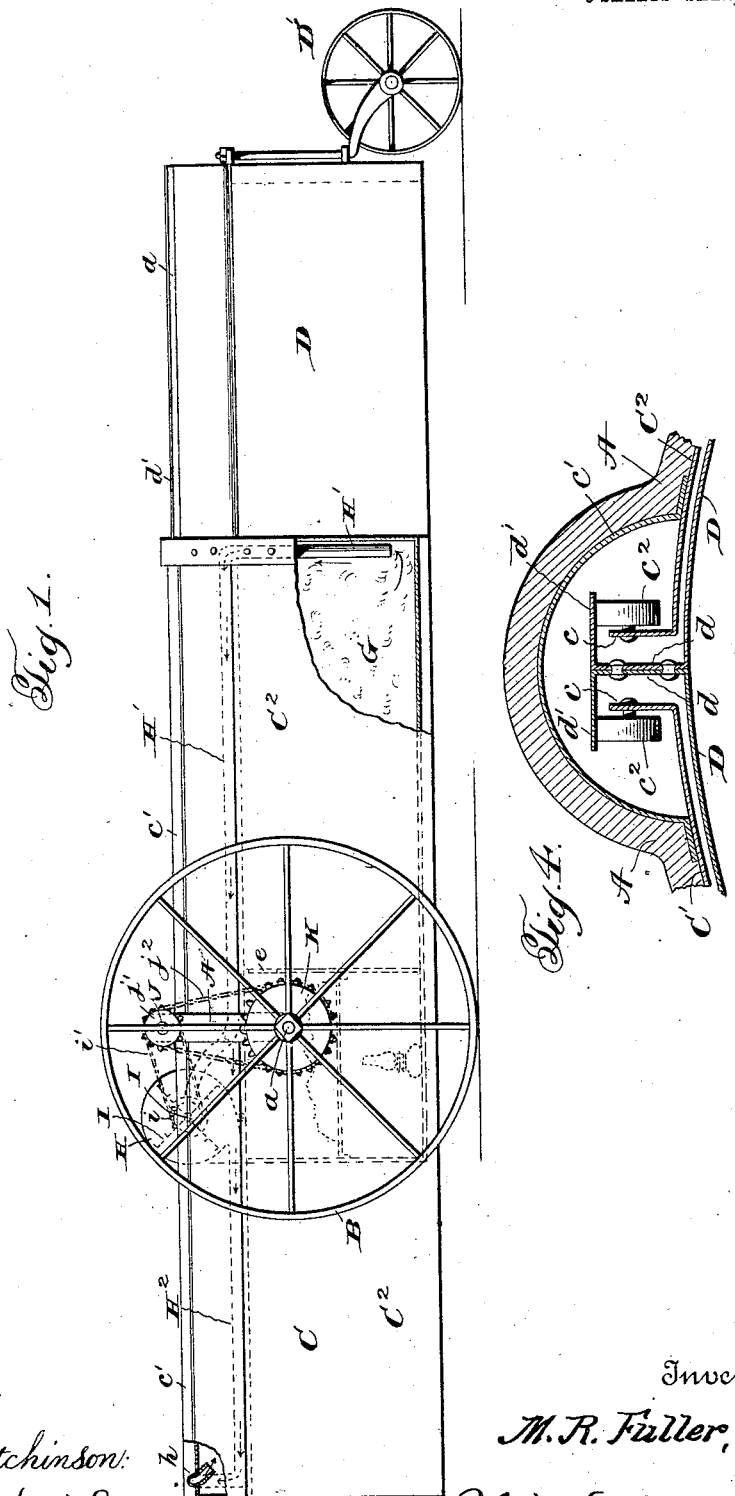
Witnesses:
Jas. E. Hutchinson
Thos. R. Heath
Inventor:
M. R. Fuller,
By John M. Grillman Attorney No. 860,862. PATENTED JULY 23, 1907.
M. R. FULLER.
FUMIGATOR.
APPLICATION FILED JAN. 29, 1907.
3 SHEETS—SHEET 2.
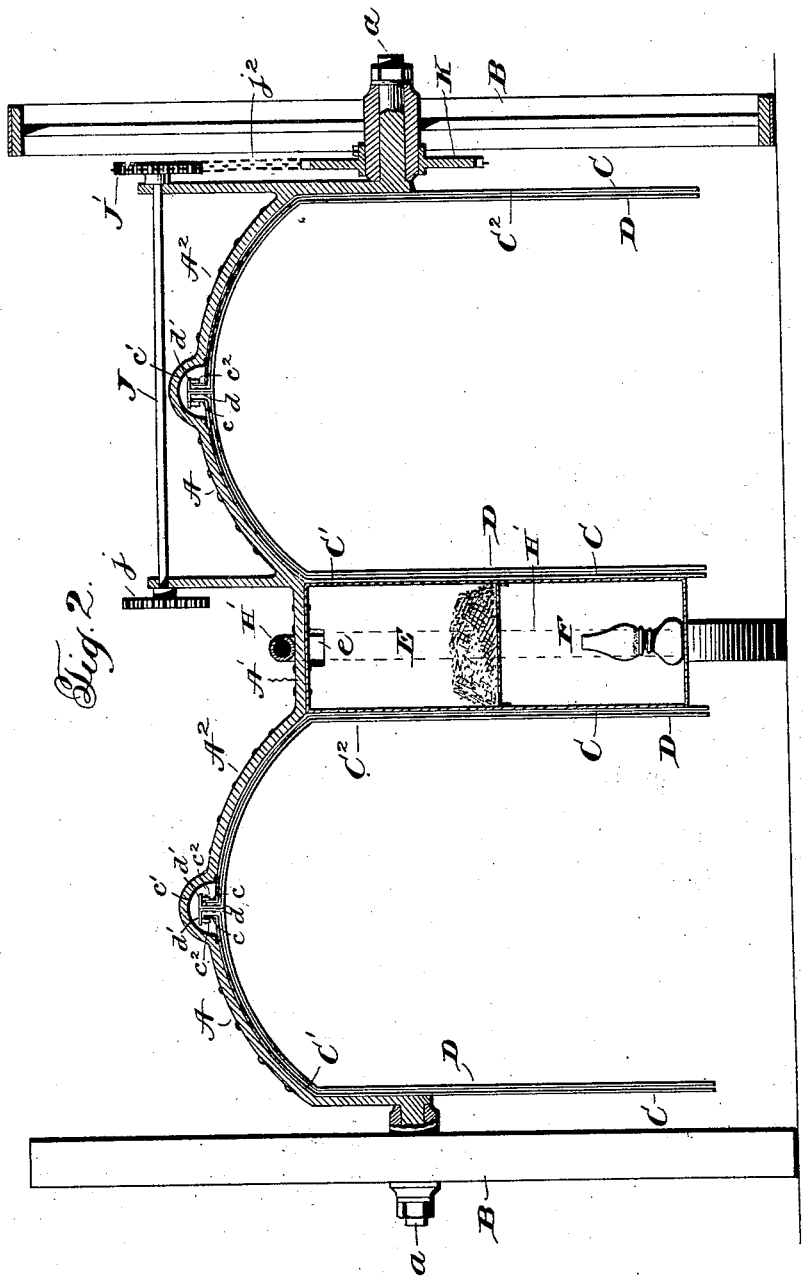

No. 860,862. PATENTED JULY 23, 1907.
M. R. FULLER.
FUMIGATOR.
APPLICATION FILED JAN. 29, 1907.
3 SHEETS—SHEET 3.
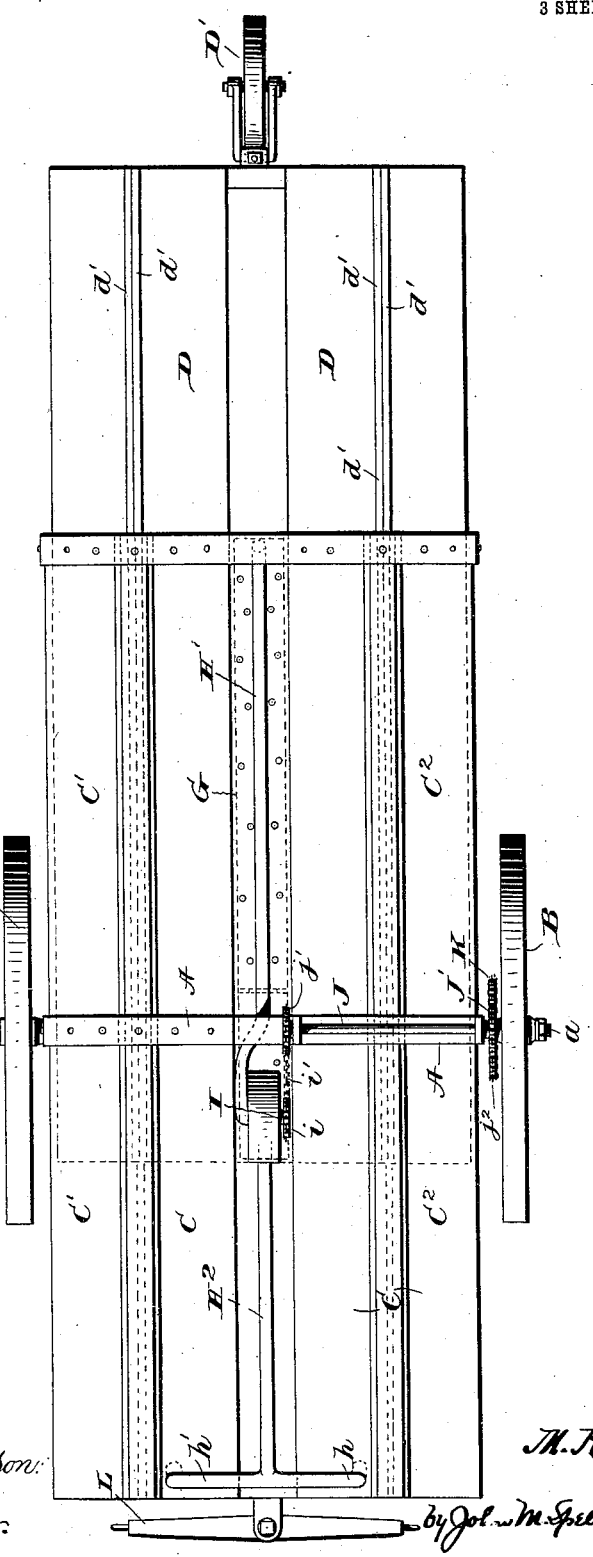

UNITED STATES PATENT OFFICE.

MENZO REED FULLER, OF GREENVILLE, TEXAS.

FUMIGATOR.

No. 860,862.

Specification of Letters Patent.

Patented July 23, 1907.

Application filed January 29, 1907. Serial No. 354,610.

*To all whom it may concern:*

Be it known that I, MENZO REED FULLER, a citizen of the United States, residing at Greenville, in the county of Hunt and State of Texas, have invented certain new and useful Improvements in Fumigators, of which the following is a specification.

This invention relates to an improvement in a machine for applying an insecticide, in the form of a gas, to growing plants, such as cotton, for the purpose of exterminating bollweevil or other insect pests, with which said plants may be infested.

The object of the present invention is the provision in a machine of this character of means for generating the gas, and means for applying the gas when so generated directly to the growing plants during the travel of the machine.

A further object of the invention is the provision of means for causing the gas to remain in close proximity to the plant for some little time, so as to thoroughly exterminate any insects with which the plant may be infested.

Other objects of the invention will be apparent from the detailed description hereinafter, when read in connection with the accompanying drawings forming a part hereof, wherein like numerals of reference refer to similar parts in the several views, and wherein a preferable embodiment of my invention is shown.

In the drawings, Figure 1 is a side elevation of my improved machine. Fig. 2 is an end elevation, parts being shown in section, and, Fig. 3 is a top plan view, and Fig. 4 is an enlarged detail view.

Referring now more particularly to the drawings, the machine, which is designed to treat two rows of plants simultaneously, consists of a frame A, from the opposite extremities of which project stub axles $a$, on which are loosely mounted the supporting wheels B. The frame A comprises a flat central portion $A'$ and arched portions $A^2$ positioned at each side thereof, each of which is designed to overlie one row of plants, when the machine is in use. Secured to the arched portions $A^2$ of the frame A, are the elongated inverted U-shaped shields, the lower edges of which extend in close proximity to the ground, so that when the machine is in use, the plants directly covered by said shields, will be substantially completely inclosed thereby. The shields C are each preferably formed in two sections $C'$ and $C^2$, the upper edges of which extend in close proximity to each other and terminate in upwardly extending flanges $c$. An arched plate $c'$ is secured to the upper edges of the sections $C'$ and $C^2$ of each of the shields C, to prevent the gas when introduced thereinto from escaping through the space formed between the upwardly extending flanges $c$ thereof. Loosely journaled at intervals along the sides of the upturned flanges $c$ of the sections $C'$ and $C^2$ of the shields C are rollers $c^2$, the peripheries of which project above the upper edges of said flanges. The shields C are each provided with an extension shield D, which is designed to telescope with the rear end thereof, so that the length of the shield may be varied as desired. The extension shields D, which are similar in configuration to the shields C, are each formed in two sections, the upper edges of which terminate in upwardly extending flanges $d$, which are riveted together. The upper edges of the flanges $d$ are bent laterally as at $d'$ to form a T-rail, the flanges of which are designed to rest upon the rollers $c^2$, secured to the flanges $c$ of the sections $C'$ and $C^2$ of the shields C.

The rear ends of the extension shields D are supported by a caster wheel $D'$, which is journaled in a suitable bracket connecting the rear ends of the inner sides of said shields. From this construction it will be apparent that the extension shields may be adjusted by the operator so that any desired number of plants may be inclosed at the same time. Any suitable means may be employed for holding the extension shields in various positions of adjustment.

Depending from the under side of the straight portion $A'$ of the frame A is a gas-generating chamber E, in which is designed to be placed any suitable material from which the gas used in treating the plants is to be generated. Positioned directly beneath the gas-generating chamber E, is a heating chamber F, which is adapted to contain a suitable lamp for heating the gas-generating chamber. Depending from the flat portion $A'$ of the frame A, and positioned directly in rear of the gas-generating chamber E, is a gas-storage chamber G, the generating chamber E being provided with a suitable passage $e$, permitting the gas to pass therefrom into said storage chamber. Mounted upon the top of the flat central portion $A'$, is a fan casing H, the inlet pipe $H'$ of which extends rearwardly along the frame of the machine, and communicates with the gas storage chamber G, and the outlet pipe $H^2$ of which extends forwardly along the frame of the machine and terminates in two laterally extending branches $h$ and $h'$, which terminate in downwardly extending portions, which project through the tops of the shields C adjacent the forward ends thereof. Mounted upon a suitable shaft I within the fan casing H is a fan $I'$ of any suitable construction. The shaft I projects without the fan casing, and has secured thereto a sprocket wheel $i$, which is connected by a sprocket chain $i'$ with a sprocket wheel $j'$ secured to a shaft J, which extends transversely of the machine and is journaled in suitable bearings extending upwardly therefrom. Secured to the outer ends of the shaft J is a sprocket wheel $J'$, which is connected by a sprocket chain $j^2$ with a sprocket wheel K, which is rigidly secured to one of the supporting wheels of the machine.

L designates a swingle tree which is secured to the forward portion of the frame of the machine.

From the above-described construction, it will be apparent that in use, the machine will be driven across the field so that the plants in two rows will be inclosed by the shields C, and that during the travel of the machine, gas will be forced by the fan I' into the forward ends of the shields and into intimate contact with the plants inclosed thereby. It will also be obvious that in view of the length of the shields C, and their extensions D, each plant will be subjected to the action of the gaseous insecticide for a considerable length of time, thereby insuring the extermination of all insects with which the plant is infested. When the machine is not in use, the shield extensions D are moved to their innermost position, so that the machine will occupy the least possible amount of space, and will be readily movable from place to place.

I do not desire to limit myself to the precise form and construction shown in the drawings, as it is obvious that many minor changes might be made thereto without departing from the spirit of the invention as defined in the appended claims.

Claims.

1. In a machine of the character described, a frame, and a longitudinally extensible shield carried by said frame, and adapted to inclose plants during the travel of the machine.

2. In a machine of the character described, a frame, a longitudinally extensible shield carried by the frame and adapted to inclose plants during the travel of the machine, and means for introducing an insecticide into the forward end of said shield.

3. In a machine of the character described, a frame, an elongated shield carried by said frame, and adapted to inclose plants during the travel of the machine, a gas generating chamber carried by the machine, and means for conducting gas from the generator to the forward end of said shield discharging the same rearwardly thereof.

4. In a machine of the character described, a frame, an elongated shield carried by said frame and adapted to inclose plants during the travel of the machine, a gas generating chamber, a gas storage chamber communicating therewith, and means for conducting gas from the gas storage chamber to the forward end of said shield.

5. In a machine of the character described, a frame, an elongated shield carried by the frame and adapted to inclose plants during the travel of the machine, a gas generating chamber, a gas storage chamber communicating therewith, and a blower for conducting gas from the gas storage chamber to the forward end of said shield.

6. In a machine of the character described, a frame, supporting wheels therefor, an elongated plant covering shield carried by said frame, and an extension shield slidably engaging said first-mentioned shield.

7. In a machine of the character described, a frame, supporting wheels therefor, an elongated plant-covering shield carried by said frame, an extension shield slidably engaging the rear end of said first-mentioned shield, and a supporting wheel secured to the outer end of said extension shield.

8. In a machine of the character described, a frame, supporting wheels therefor, an elongated plant covering shield carried by said frame, an extension shield slidably engaging the rear end of said first-mentioned shield, and a caster wheel journaled in bearings secured to the outer end of said extension shield.

9. In a machine of the character described, a frame, a pair of separated elongated plant covering shields carried by said frame, a closed gas generating chamber supported by the frame between said shields, and a conduit for conducting gas from the generator to the forward ends of said shields.

10. In a machine of the character described, a frame, a pair of separated elongated plant covering shields carried by said frame, a gas storage chamber supported by the frame between said shields, a blower supported by the frame, an inlet pipe leading from the blower to the gas storage chamber, and outlet pipes leading from the blower to the forward ends of said shields.

11. In a machine of the character described, a frame, supporting wheels therefor, a pair of elongated plant covering shields carried by said frame, a pair of extension shields slidably engaging the rear ends of said first mentioned shields, and a supporting wheel secured to the outer ends of said extension shields.

12. In a machine of the character described, a wheeled frame, an elongated plant covering shield carried by said frame and provided with a longitudinally extending slot in the top thereof and with upwardly extending flanges at each side of said slot, a plurality of rollers secured at intervals to said flanges, and an extension shield slidably engaging said first-mentioned shield and provided with a T-rail adapted to engage the rollers secured to the upwardly extending flanges thereof.

In testimony whereof I have signed my name to this specification in the presence of two subscribing witnesses.

MENZO REED FULLER.

Witnesses:
M. HEAFER,
E. V. HARDWAY.